United States Patent [19]

Holley

[11] Patent Number: 4,478,152
[45] Date of Patent: Oct. 23, 1984

[54] RAILROAD SCRAP PICK UP MACHINE

[75] Inventor: John D. Holley, Montgomery, Ala.

[73] Assignee: Holley Engineering Company, Inc., Montgomery, Ala.

[21] Appl. No.: 446,413

[22] Filed: Dec. 2, 1982

[51] Int. Cl.³ .............................................. B61F 19/06
[52] U.S. Cl. .................................. 104/279; 414/437; 209/215; 209/219; 104/1 R
[58] Field of Search ................. 209/215, 218, 219, 38, 209/420, 421, 636; 414/437, 439, 440; 171/16; 198/510, 506, 314–316, 690, 312; 37/104; 104/1 R, 2, 17 R, 279, 45

[56] References Cited

U.S. PATENT DOCUMENTS

2,900,076  8/1959  Israelson et al. ..................... 209/215
3,690,264  9/1972  Plasser et al. ....................... 104/17 R
4,225,429  9/1980  Holley ................................. 209/215

Primary Examiner—David A. Scherbel
Assistant Examiner—Glenn Foster
Attorney, Agent, or Firm—Kerkam, Stowell, Kondracki & Clarke

[57] ABSTRACT

A railroad scrap pick up machine includes a magnetic wheel and transversely extending support arm or beam which pivots in a plane transverse to the right and left sides of the machine. The magnetic wheel may alternately be mounted on the left or right side of the machine for picking up loose tie plates disposed on the railroad bed. The single magnetic wheel which is used for picking up tie plates may be removed and a support arm having two magnetic wheels for picking up spikes may be attached at either the right or left side of the machine. Stripper trays are used for separating metallic articles from the magnetic wheels. Crawlers which may slide from left to right on the machine are used to support the machine when traveling on a roadbed having only one rail.

22 Claims, 7 Drawing Figures

RAILROAD SCRAP PICK UP MACHINE

BACKGROUND OF THE INVENTION

The present invention relates to machines used for picking up scraps along a railroad bed. More specifically, this invention relates to a machine using magnets to pick up metallic scraps along a railroad bed.

The use of magnetic wheels to pick up metallic scrap along railroad beds is well known in the art. When disassembling a rail for replacement, several small metallic articles including spikes, tie plates, and anchors are removed and layed upon the railroad bed. Since it is desirable to clear the roadbed of such metallic articles and re-use such articles, the prior art has heretofore used various magnetic wheel constructions for picking up these metallic articles.

The following U.S. patents are illustrative of various prior art magnetic wheel pick up machines:

| U.S. Pat. No. | Inventor | Issue Date |
| --- | --- | --- |
| 3,690,264 | Plasser et al | September 12, 1972 |
| 3,731,455 | Theurer | May 8, 1973 |
| 4,225,429 | Holley | September 30, 1980 |

The Plasser et al patent discloses a track working apparatus for assembling and disassembling tie plates. Additionally, a rotating magnetic means is used to pick up tie plates which are then deposited on an inclined conveyor belt by a doctor blade. The inclined conveyor belt lifts the tie plates up to a receptacle where they are deposited.

The Theurer patent shows the use of a conveyor belt having a magnet or magnets located within the conveyor belt. The conveyor belt picks up loose metallic articles upon a railroad bed and moves them horizontally for deposit onto an inclined conveyor belt.

Applicant's previous U.S. Pat. No. 4,225,429 shows a magnetic pick up wheel arrangement wherein scrap metallic articles are picked up by a magnetic wheel having a conveyor belt turning around its outside. The metallic articles are deposited upon the conveyor belt which is inclined to extend above a separate conveyor belt which is used for storing the metallic articles. As is best shown in FIG. 5 of the patent, separate magnetic wheels and associated conveyors may be used inside and outside the two rails upon a railroad bed. When cleaning up metallic articles upon a railroad bed wherein one of the two rails has been removed, a crawler (see especially FIGS. 8 and 9) may be lowered to support the side of the pick up machine which cannot be supported by its rolling wheels because of the previous removal of the rail on that side.

Figures 1, 2:
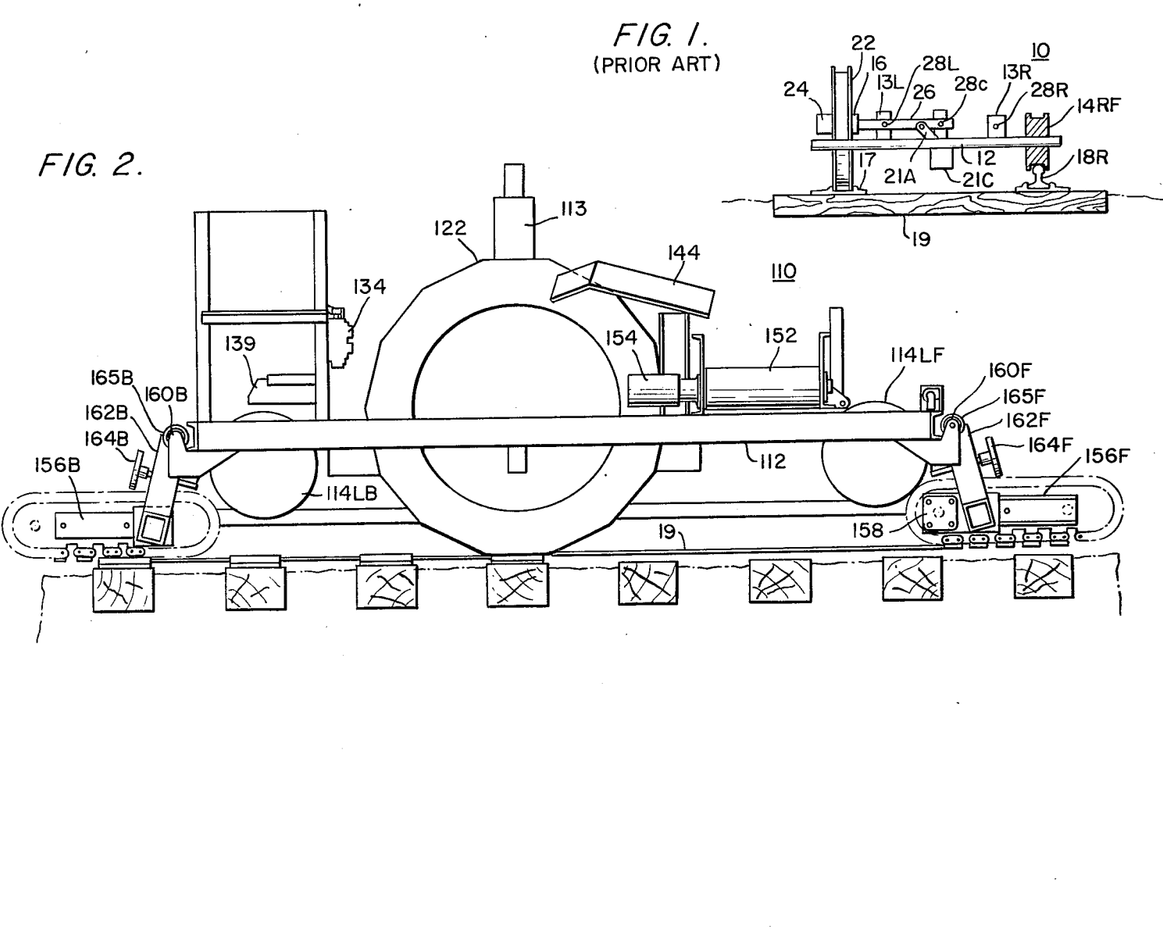
FIG. 1 is a prior art device as discussed above.
FIG. 2 shows a side view of the present invention.

The prior art further includes a device which has been marketed by the present applicant and is shown schematically in simplified form in FIG. 1. This prior art machine 10 includes a frame structure 12 and four wheels 14 for rolling along a railroad track. Since the FIG. 1 view is an end view, only one of the right front wheel 14RF on the right side is shown, whereas the wheels are deleted from the left side for ease of illustrating various other features of this device. Attached to the frame structure 12 are mounting arms 13C, 13R, and 13L. A magnetic wheel 22 is shown on the left side of the machine 12 and is pinned to points 28C and 28L in respective parts 13C and 13L. The magnetic wheel 22 is turned by a hydraulic motor 16 by way of reduction gearing 24. Motor 16 is powered by a hydraulic pressure source (not shown) disposed on the machine frame 12. The magnetic wheel 22 is supported by a support beam 26 which extends to the centrally located vertical beam 13C where it is pivotally connected at pivot point 28C. The magnetic wheel 22 is in line with a plane which would be defined by the left side track wheels 14, which wheels are deleted from the view of FIG. 1 in order to show the operation of magnetic wheel 22.

As shown in FIG. 1, the left side rail has been removed from the railroad bed and only the right rail 18R remains. Accordingly, the two left side wheels 14 (not shown) would drop down to the roadbed 19 except for the magnetic wheel 22 which supports the left side of the machine frame structure 12.

As the machine 10 rolls along a railroad rail 18R, the magnetic wheel 22 picks up metallic articles such as tie plate 17. The tie plate 17 will rotate with the magnetic wheel 22 until it reaches a stripper tray (not shown) which causes the tie plate 17 and other metallic articles to be separated from the magnetic wheel 22 and drop into a storage means such as the storage conveyor disclosed in applicant's patent 4,225,429.

If desired to pick up tie plates at the right side of machine 10, the pin at 28L is removed and a hydraulic cylinder 21C having a piston (not shown) with arm 21A is actuated to lift support arm 26 (arm 21A is pinned thereto), magnetic wheel 22, motor 16, and gearing 24 to a center position. The support arm 26 may be pushed over center and magnetic wheel 22 lowered on the right side with hydraulic cylinder 21C and arm 21A preventing wheel 22 from dropping too fast. The support arm 26 pivots about 28C in a vertical plane throughout this change-over. The support arm 26 is now pinned to point 28R in 13R for operation of magnetic wheel 22 on the right side. By removing the pin holding support arm 26 to point 28R (or 28L), the support arm 26 can be lifted by hydraulic arm 21A to allow travel along a track with right and left rails.

Although the prior art devices have been generally useful in providing pick up of metallic scrap articles disposed upon a railroad bed, there have been several problems associated with various of these designs.

Those prior art designs which require an inclined conveyor belt are somewhat complex. Specifically, such inclined conveyor belts must be adapted to function while still allowing the magnetic wheel to rise and fall with the peaks and troughs in the railroad bed.

The prior art design shown in FIG. 1 is somewhat disadvantageous in that the magnetic wheel 22 is used to support the frame structure 12. Since this magnetic wheel must rise and fall with the peaks and troughs in the railbed, the machine 10 will likewise rise and fall with irregularities in the railbed. This places great stress on the machine and causes rapid wearing of the parts as the machine is used.

Another disadvantage common to several scrap pick up machines is their general inability to pick up one kind of metallic scrap or article, while not picking up other kinds. That is, most prior art magnetic wheel pick up machines pick up spikes and tie plates for example at the same time. Since spikes and tie plates eventually must be separated, picking up these articles together will require a separate sorting step.

SUMMARY OF THE INVENTION

Accordingly, it is an object of the present invention to provide a new and improved railroad scrap pick up machine.

A further object of the present invention is to provide a railroad scrap pick up machine which is relatively simple in construction and reliable in operation.

A further object of the present invention is to provide a railroad scrap pick up machine which is not subject to undue amounts of stress.

A still further object of the present invention is to provide a railroad scrap pickup machine which allows one to pick up a particular type of metallic article (e.g., tie plate, spike) at a time, but is adaptable to pick up other types of metallic articles separately.

Another object of the present invention is to provide a railroad scrap pick up machine which uses a magnetic wheel which rises and falls with the peaks and troughs in the railroad bed, but which does not cause the machine itself to rise and fall.

Yet another object of the present invention is to provide a railroad scrap pickup machine which uses two magnetic wheels simultaneously for picking up metallic articles inboard and outboard of a rail.

A further object of the present invention is to provide a railroad scrap pickup machine which is adapted to allow a magnetic wheel to be alternately mounted on either side of the machine.

These and other objects of the present invention which will become apparent as the description proceeds are realized by a railroad scrap pick up machine for picking up loose metallic parts along a railroad bed comprising: a frame structure defining a front, a back, and first and second sides of the machine, at least two wheels on the first side of the frame structure for rolling movement along at least a first rail on a railroad bed, a first magnetic wheel rotatably disposed at the second side and mounted to a support beam extending across to the first side, the support beam being secured at a first side pivot point, supporting means for keeping the second side of the frame structure above the railroad bed as the two wheels roll along the one rail and as the first magnetic wheel rolls along in contact with a railroad bed, stripper means mounted to the frame structure and disposed completely above a lowest point on the first magnetic wheel, and a storage means mounted to the frame structure adjacent the stripper means. The first magnetic wheel is operative to rotate and pick up metallic parts as the machine is moved along a railroad bed, the stripper means is operative to remove metallic parts from the first magnetic wheel and deposit the metallic parts in the storage means, and the first magnetic wheel follows peaks and troughs in a railroad bed by moving up and down with the support beam pivoting about the first side pivot point and without causing up and down movements of the frame structure. The stripper means is preferably a stripper tray means in contact with the first magnetic wheel and being slidable between the first side and the second side. The first magnetic wheel and its support beam are further securable at a second side pivot point with the first magnetic wheel rotatably disposed at the first side and the support beam extending to the second side. The pick up machine further comprises: two wheels on the second side of the frame structure for rolling movement along a second rail on a railroad bed, and a lifter mounted to the frame structure for lifting the first magnetic wheel into an upper position removed from a railroad bed. The lifter is operative to lift the first magnetic wheel by lifting the support beam when the first magnetic wheel is disposed on the first side and when the first magnetic wheel is disposed on the second side. The storage means is a horizontal conveyor belt. The supporting means includes first and second crawler means mounted to the frame structure and alternately disposable at the first side of the frame structure for supporting the machine in the absence of a rail on the first side and at the second side of the frame structure for supporting the machine in the absence of a rail on the second side. The first and second crawler means are each mounted for sliding movement between the first side and the second side. The machine further comprises a second wheel rotatably disposed at the second side and wherein the second wheel is operative to rotate and pick up metallic parts as the machine is moved along a railroad bed, the stripper means is operative to remove metallic parts from the second magnetic wheel and deposit the metallic parts on the storage means, and the second magnetic wheel is free to follow peaks and troughs in a railroad bed without causing up and down movement of the frame structure. The second magnetic wheel is mounted to the support beam, and the first and second magnetic wheels are removable by disconnecting a connecting means and the machine is adapted to allow the mounting of a single magnetic wheel on the frame structure by the connecting means upon the removal of these first and second magnetic wheels, the single magnetic wheel being operative in similar fashion to the first and second magnetic wheels and being disposed in coplanar fashion to two of the wheels. The storage means includes a lower support surface and the first and second magnetic wheels extend above a highest point of the lower support surface and the stripper tray means is operative to remove metallic articles from the first and second magnetic wheels whereupon the metallic articles move down to the storage means.

BRIEF DESCRIPTION OF THE DRAWINGS

The above and other features of the present invention will be more readily understood when considered in conjunction with the detailed description and the accompanying drawings in which like reference characters indicate like parts throughout several views and in which.

DETAILED DESCRIPTION OF THE PREFERRED EMBODIMENTS

The present invention includes numerous components which may be realized by using the similarly constructed components disclosed in applicant's U.S. Pat. No. 4,225,429, which is hereby incorporated by reference. Accordingly, these components need not be discussed in detail herein.

Figure 3:
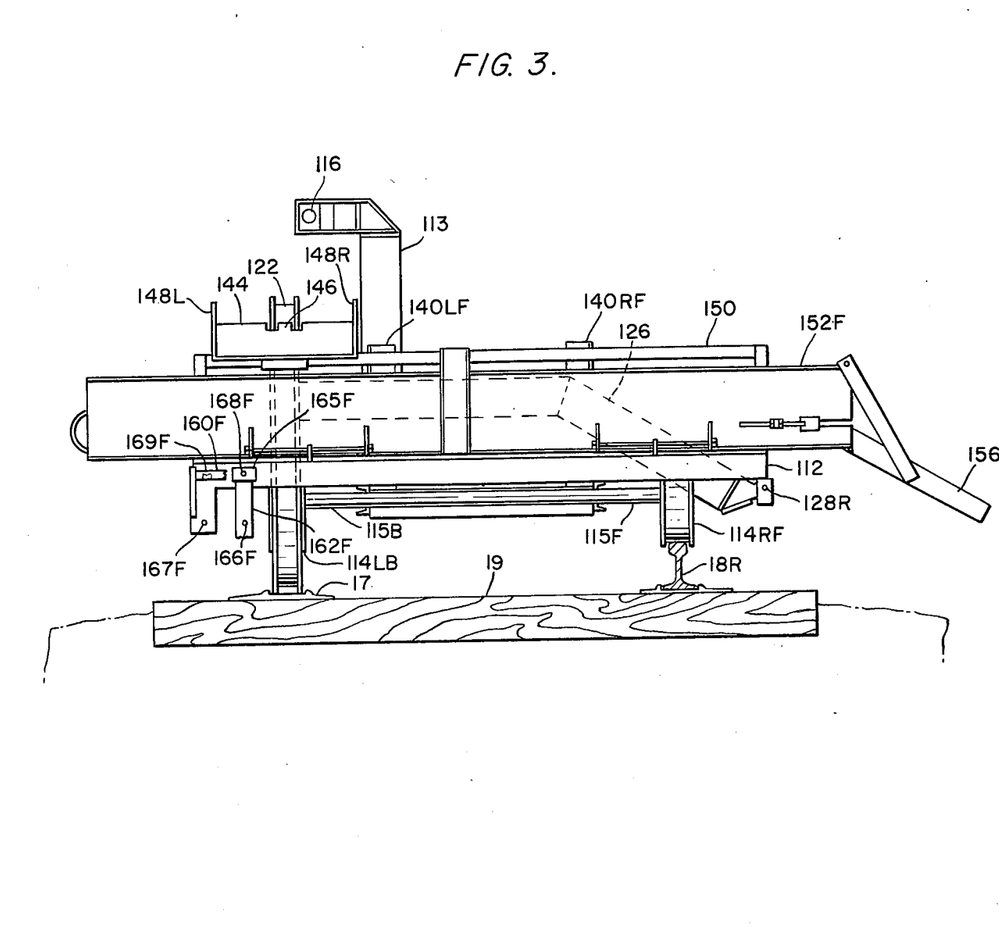
FIG. 3 shows a simplified end view of the present invention.
Figure 4:
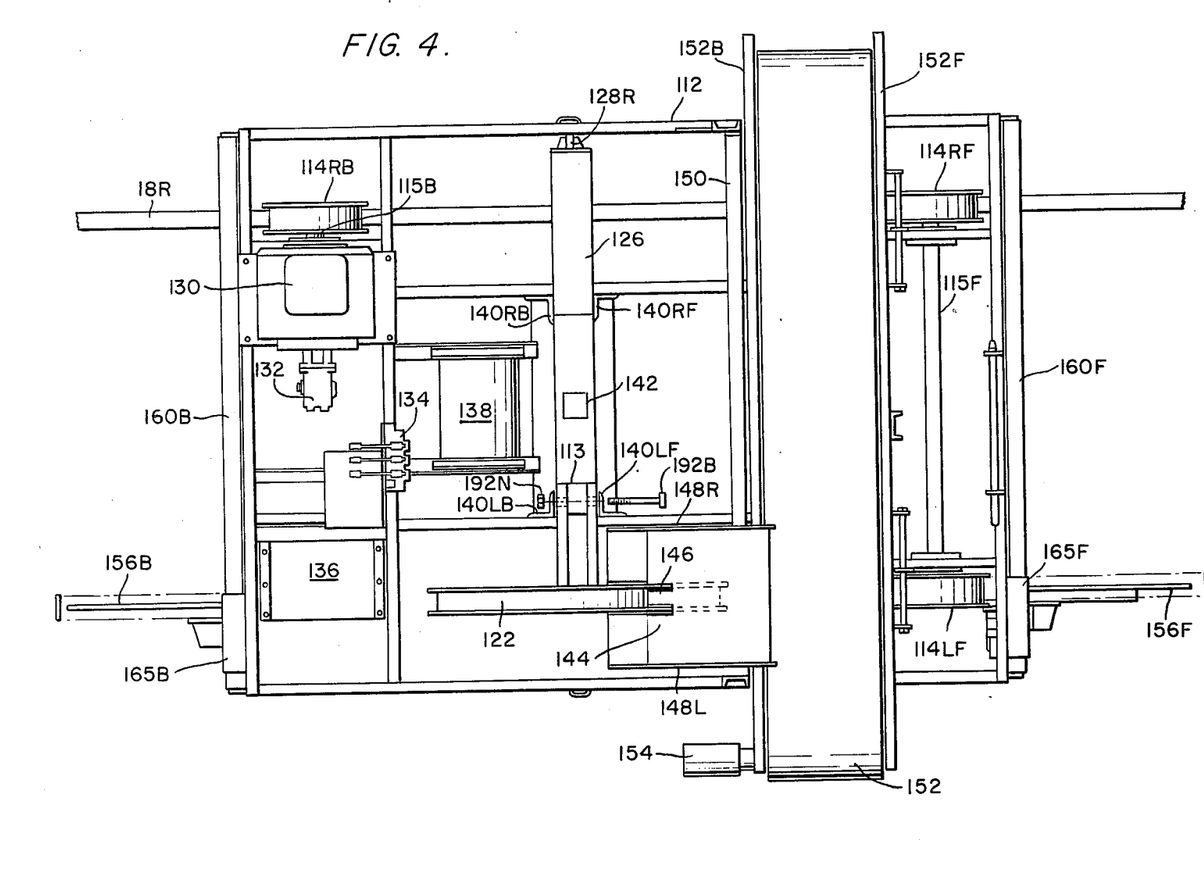
FIG. 4 shows a top view of the present invention.

Turning now to FIGS. 2, 3, and 4, the construction of the present railroad scrap pickup machine 110 will be discussed. FIG. 2 shows a side view of the present invention 110, whereas 3 shows a simplified end view of the present invention. FIG. 4 shows a top view of the present invention.

The present invention 110 includes a frame structure 112 having right and left front wheels 114RF and 114LF mounted on front axle 115F and right and left back wheels 114RB and 114LB mounted on back axle 115B. An engine 130 powers a hydraulic pump 132 which is part of a hydraulic system used to power various hydraulic motors used with the present invention. Hydraulic control valve or valves 134 are used for controlling the flow of hydraulic fluid in the hydraulic system which also includes a hydraulic tank 136. The internal combustion engine 130 is provided fuel from the fuel tank 138 and electric energy from the engine battery 139. The engine and its associated parts and the hydraulic system may be constructed in similar fashion to the corresponding components in the incorporated by reference U.S. Pat. No. 4,225,429. The rear wheels 114RB and 114LB may be driven directly by the engine 130 or, alternately, by way of a hydraulic motor (not shown) powered by the hydraulic pump 132.

A magnetic wheel 122 is mounted to support beam 126 which is secured to the frame structure 112 at a right side pivot point 128R. Extending up from the support beam 126 is a vertical portion 113 which turns outwardly as shown at its top and includes a lift hole 116. A hole is disposed in the lowest part of the vertical portion 113 and may be used for pinning the magnetic wheel 122 and its support beam 126 to the pieces 140LF and 140LB of the frame structure 112 as discussed below. A cover 142 is disposed over a hole in the support arm 126 and functions with a hydraulic lifter in a manner described below in conjunction with FIG. 6. The magnetic wheel 122 is disposed in coplanar fashion to wheel 114LB (see FIG. 3) and wheel 114LF (not shown in FIG. 3) when operating so that it rolls where the left side rail has been removed from as shown in FIG. 3.

A stripper tray 144 including an inner tongue portion 146 and right and left side walls 148R and 148L is slidably mounted upon a transverse rod 150 which extends between the left and right sides of the machine 110. The stripper tray 144 is mounted for free rotation about the axis of the transverse rod 150 and the rod 150 is mounted to the frame structure 112 as shown. The stripper tray 144 functions as a doctor blade in a manner described below.

A storage belt conveyor 152 is powered by a hydraulic belt conveyor drive motor 154 and functions in a manner generally similar to the conveyor 66 in the applicant's incorporated-by-reference patent. Panels 152F and 152B respectively serve as front and back boundaries for conveyor belt 152. A conveyor chute 156 is disposed at the right side of the conveyor belt 152, but could be mounted at the left side of conveyor belt 152 if desired.

Front and back crawlers 156F and 156B are respectively disposed at the front and back of the frame structure 112. The crawlers 156F and 156B, which are preferably padded roller chain type crawlers, are constructed and mounted identically except that the front crawler 156F preferably includes a hydraulic motor 158 whereas the back crawler 156B is an idler crawler. Crawlers 156F and 156B are respectively mounted on front and back transverse rods 160F and 160B.

Only the details of the mounting of the front crawler 156F will be discussed herein, it being readily understood that the back crawler 156B is mounted in identical fashion. A mounting arm 162F extends up from the crawler 156F and has a sleeve 165F disposed around the transverse rod 160F.

As best shown in FIG. 3, hole 166F in the mounting arm 162F and cooperating hole 167F are used to secure the front crawler 156F to the frame structure 112. FIG. 3 has been simplified for ease of illustration in that the crawler itself 156F and a locking pin 164F are not shown, whereas the transverse front rod 160F and the support arm 162F are shown partially broken away. When it is desired for the front crawler to provide support for the left side of the machine 110, the locking pin 164F extends through holes 166F and 167F to hold the crawler 156F in an operational position. This would be necessary when the machine is operating along a roadbed having only a right side rail 18R as shown in FIG. 3. When the machine is operating along a roadbed having two rails, support for the left side of the machine 110 may be provided by the left wheels 114LF (not shown in FIG. 3) and 114LB. Accordingly, the front crawler 156F (as well as the back crawler 156B) may be moved to an upper position not in contact with the roadbed 19. In particular, locking pin 164F, which could be a bolt, a cotter pin, among other arrangements, is removed. The mounting arm 162F and attached crawler 156F may then be rotated upwardly until a hole 168F in the sleeve 165F has lined up with a hole 169F in the transverse rod 160F. The locking pin 164F or a different locking pin may then be placed through the holes 168F and 169F to lock the crawler 156F in an upper position.

Each of the front and back transverse rods 160F and 160B extend between the right and left sides of the machine 110 and include holes similar to 169F and 167F at both of the right and left sides. The crawlers 156F and 156B may thus be secured in either operational or upper positions at either the right or left sides of the machine 110.

As best shown in FIG. 3, the magnetic wheel 122 is specifically adapted to pick up tie plates such as tie plate 17. The magnetic wheel 122 is mounted to the right side pivot point 128R such that it is disposed on the left side of the machine 110 in the position of a left rail which has previously been removed. Accordingly, the magnetic wheel 122 will roll along when the machine is operating and pick up tie plates such as tie plate 17 without picking up metallic articles which are transversely disposed (i.e., left to right as shown in FIG. 3) from the tie plate 17.

Figure 5:
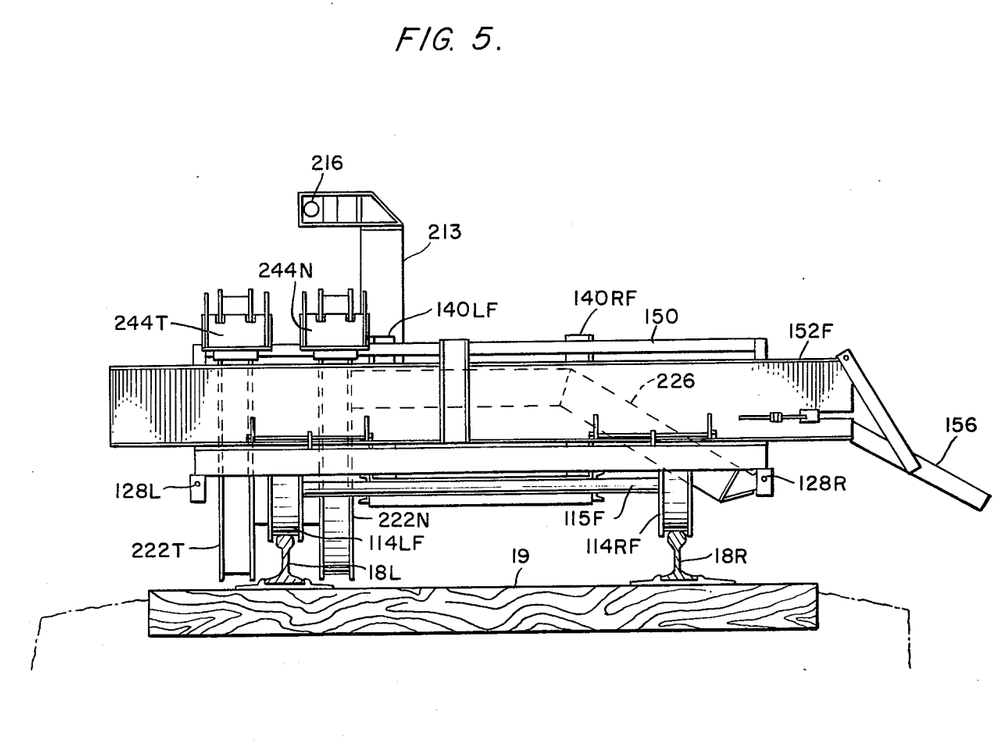
FIG. 5 shows a simplified end view of the present invention with a dual magnetic wheel attached thereto.

Turning now to FIG. 5, a simplified front view of the present invention is shown with a different magnetic wheel arrangement than that used in FIGS. 2, 3 and 4. In particular, the pin holding the magnetic wheel support arm 126 to pivot point 128R (in FIG. 3) may be removed and the magnetic wheel 122 and associated support arm 126 is removed from the machine 110 by lifting at lift point 216. The front end view of FIG. 5 has been simplified in that the crawlers 156F and 156B and associated mounting parts are not shown in FIG. 5 in order to more clearly illustrate other features of the present invention.

In FIG. 5 the support beam 126 and magnetic wheel 122 have been respectively replaced with support beam or arm 226 and inner and outer magnetic wheels 222N and 222T. The support beam or arm 226 is pinned to the right side pivot point 128R to support the inner and outer magnetic wheels 222N and 222T which are respectively disposed inside and outside of the left rail 18L upon which the left wheels 114LB (not visible in the view of FIG. 5) and 114 LF are supported. The magnetic wheel support beam or arm 226 includes a vertically extending portion 213 and a leftwardly extending portion at its top having a lifting holed 216 disposed therein. The vertical portion 213 may be pinned to angle irons 140LF and 140Lb to lock the magnetic wheels and support arm 226 to the machine 110 for transportation purposes.

In addition to mounting the dual magnetic wheels 222N and 222T on the machine 110, the stripper tray 144 may be slid off one end of the transverse rod 150 and replaced with separate inner and outer stripper trays 244N and 244T which cooperate with the corresponding respective magnetic wheels 222N and 222T in similar fashion to the cooperation between stripper tray 144 and the single magnetic wheel 122 as discussed above. The only difference with the stripper tray 244N and 244T from the stripper tray 144 of FIG. 3 is that the dimensions may be slightly different. Both stripper trays 244N and 244T are mounted to a sleeve which is slidable along transverse rod 150. Alternately, instead of using separate stripper trays 244T and 244N, one could use a single stripper tray which includes an arrangement of tongues similar to tongue portion 146 such that it could accomodate either the single magnetic wheel 122 or the two separate magnetic wheels 222N and 222T. However, it is believed preferable to include separate stripper trays 244T and 244N such that each may independently track up and down movements of their associated magnetic wheels.

The magnetic wheels 222N and 222T are circular, whereas single magnetic wheel 122 has a plurality of chords at its periphery as best shown in FIG. 2. The chords are advantageous to help lift the tie plates.

Figure 6:
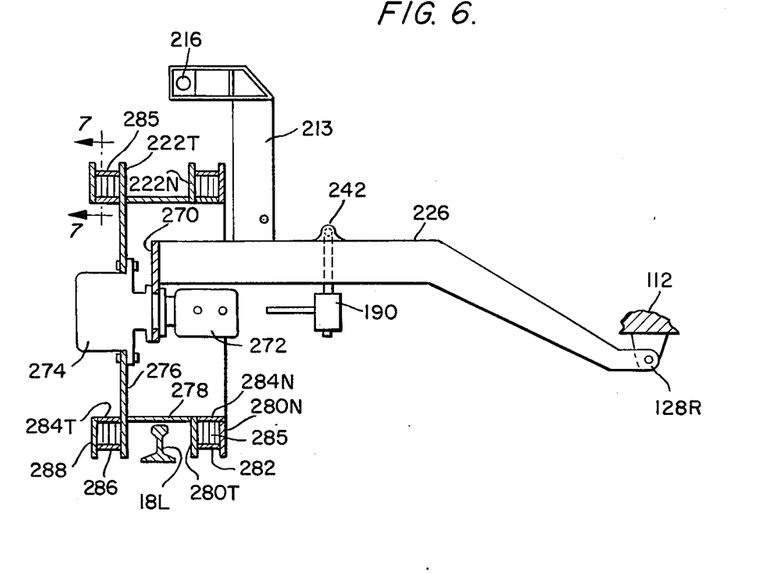
FIG. 6 is a schematic end view showing the details of the dual magnetic wheel construction and mounting.

Turning now to FIG. 6 and continuing to consider FIG. 5, various construction details of the parts associated with the magnetic wheels 222N and 222T will be discussed in detail. FIG. 6 shows a simplified view of the magnetic wheels 222T and 222N and various associated parts including the magnetic wheel support arm or beam 226. The support arm 226 is pinned at a right side pivot point 128R to a flange extending below the frame structure 112. The support arm 226 extends transversely to the frame structure 112 from left to right and includes a mounting piece 270 at its left side. The mounting piece 270 supports a hydraulic magnetic wheel drive motor 272 which drives an annular magnetic wheel piece 276 by way of a reduction gearing arrangement 274, which reduction gearing arrangement is used to ensure that the magnetic wheels turn at approximately the same speed as the machine 110 moves down the track. A ring or cylindrical piece 278 is welded to the inside of an annular piece 276 and in turn has an annular piece 280T welded to it. A cylindrical piece 282 is welded to piece 280T and has annular piece 280N welded to its other side. A series of pieces 284N are removably attached to hold block magnets 285 within the cylindrical or donut-like cavity defined by the pieces 280T, 282, 280N and 284N. A cylindrical piece 286 is welded to the outer face of annular piece 276 and has an annular piece 288 welded to it such that a series of removable outer pieces 284T may secure magnetic blocks 285 within the cavity defined by these pieces as shown.

Figure 7:
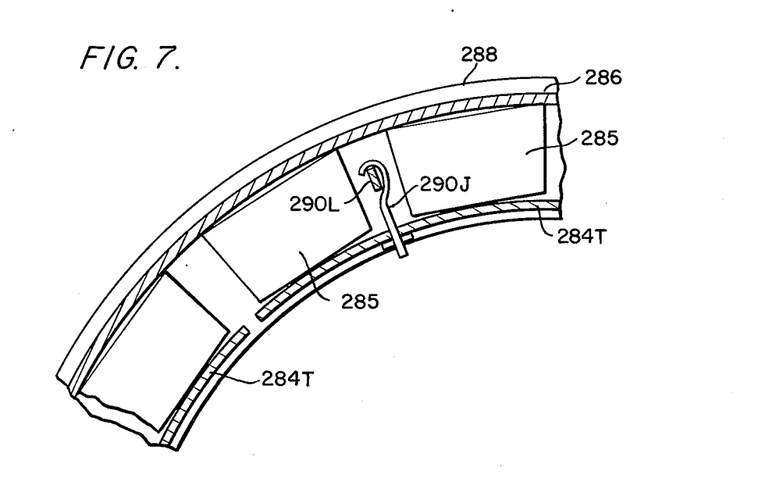
FIG. 7 is broken away side view in partial cross section illustrating construction details of a magnetic wheel according to the present invention.

Turning now to FIG. 7, there is shown a cross section taken along lines 7—7 of FIG. 6. In particular, the cross section shows the outer annular piece 288 broken away and the cylindrical piece 286 in cross section. A series of magnetic blocks 285 are locked next to the radially inner surface of cylindrical piece 286 by operation of a J-bolt 290J and locking piece 290L which is welded between annular piece 288 and piece 276 (not shown in FIG. 7). The J-bolt 290J holds magnetic blocks 285 by holding the removable cylindrical piece 284T sufficiently close to the cylindrical piece 286. Although FIG. 7 shows only one locking piece 290L and one J-bolt 290J, it will be readily understood that these are radially distributed throughout the outer magnetic wheel 222T to secure the magnetic blocks 285 to the cylindrical piece 286 which extends in a closed circular loop. In similar fashion, the removable pieces 284N and a series of locking pieces and J-bolts respectively similar to 290L and 290J may be used to secure the magnetic blocks 285 on the inner magnetic wheel 222N.

It is preferable that the pieces 290L, 290J, 282, 284N, 284T, 286, are all made of stainless steel to avoid adverse effects on the magnetic fields established by the magnetic blocks 285. Conversely, the pieces numbered 276, 278, 280N, 280T, and 288 are made of magnetic material and alternately become the North and South poles of the magnets. With the exception of removable pieces 284N and 284T, some or all of these pieces may be different portions of a single piece.

The single magnetic wheel 122 may be constructed in similar fashion to the dual magnetic wheels 222N and 222T. The construction would be somewhat simpler and could simply have pieces like 286, 288, and 284T inboard (instead of outboard as shown in FIG. 6) of a piece like 276. Also, the magnetic wheel 122 has chords at its periphery as shown in FIG. 2.

Operation

The operation of the present invention will now be discussed with reference to FIGS. 2-6. The operation of the present invention will initially be discussed when using the single magnetic wheel 122 as shown in FIGS. 2-4.

The machine 110 rolls along a single rail 18R of a railroad roadbed 19 and is supported by right wheels 114RF and 114RB on its right side. The left side of the machine 110 is supported by the crawlers 156F and 156B, the front crawler 156F being powered by the hydraulic motor 158. The front crawler 156F will move at the same speed as the power provided to the rear wheel 114RB. At the same time, the magnetic wheel 122 is rotated by a hydraulic motor 172, which is not shown but would be positioned identically to the hydraulic motor 272 of FIG. 6.

As the magnetic wheel 122 rotates, it picks up the tie plates such as tie plate 17, the tie plates being separated from the magnetic wheel 122 by the stripper tray 144. The stripper tray 144 functions as a doctor blade and causes the tie plates picked up by the magnetic wheel to be deposited onto the horizontal conveyor belt 152. When all of the loose tie plates have been picked up or when the conveyor belt 152 has been completely filled, the conveyor belt 152 may be turned on to discharge the tie plates by way of conveyor chute 156. The conveyor belt, which is energized by hydraulic motor 154 controlled by one of the hydraulic control valves 134, may additionally be energized even as the magnetic wheel motor is turning such that the tie plates are distributed relatively evenly throughout the width (i.e. left to right in FIG. 3). The tie plates which would be discharged at the side of the track may be picked up by a crane having a magnetic grabber as is commonly used.

Advantageously, no conveyor belt is needed to lift the metallic articles since the magnetic wheel 122 (and magnetic wheels 222T and 222N) extend above a highest point of the horizontal conveyor belt 152 which serves as a lower support surface of the storage means defined by conveyor 152 and front and rear panels 152F and 152B.

When a new left side rail (not shown in the drawings) has been layed, it will be necessary to pick up the tie plates on the right side of the roadbed 19. In this case, the right side rail 18R will be missing but the machine 110 may be supported on its left side by the rolling wheels 114LF and 114LB on the new left side rail. The present invention can easily accomodate this by a series of steps to change over to right side pick up operation. In particular, the locking pins 164F and 164B may be removed and the front and back crawlers are slid along the respective transverse rods 160F and 160B to the right side of the machine 110. The locking pins 164F and 164B are then secured in place. A connecting pin at the right side pivot point 128R is removed allowing the magnetic wheel 122 to be lifted by lift hole 116 and rotated 180°. The magnetic wheel is then lowered in place with a connecting pin securing the support arm 126 to the left side pivot point 128L. The stripper tray 144 may be freely slid along its transverse rod 150 and placed such that the grooves on the side of its tongue portion 146 now hold it onto the right side of the transverse rod 150. The machine 110 may then be used for picking up tie plates on the right side of the track.

When the machine has finished picking up all the tie plates, or it is otherwise desired to move the machine quickly along a track having two rails, the front and back crawlers 156F and 156B are locked in upper positions by locking the sleeves 165F and 165B to the respective transverse rods 160F and 160B such that the crawlers 156F and 156B are held out of contact with the roadbed 19. Additionally, one of the hydraulic valves 134 may be actuated to cause the hydraulic lifter 190 (shown only in FIG. 6) to lift the support arm 126 such that the magnetic wheel 122 is out of contact with the ground. The hydraulic lifter 190 includes a hydraulic piston which pushes at the support arm 126 in order to lift it as it pivots about right side pivot point 128R. If the support arm 126 was pinned to the left side pivot point 128L, the hydraulic lifter 190 (which is centrally located between the right and left sides of machine 110) will likewise function to lift up support arm 126 by pivoting it about left side pivot point 128L. The machine is now set for moving along a roadbed track without the crawlers or the magnetic wheel slowing it down.

When is is desired to pick up spikes, the support arm 126 and associated 122 are removed from the machine 110 by lift hole 116 after a connecting pin holding the support arm 126 to the right or left pivot points 128R or 128L has been removed. The support arm 226 and associated inner and outer magnetic wheels 222N and 222T may then be lowered in place and pinned to the right or left pivot point 128R or 128L depending upon which side of the track the spikes are on. The stripper tray 144 may be slid off the transverse rod 150 by unscrewing a bolt at either end of transverse rod 150, the bolt being re-fastened after placing stripper trays 244N and 244T on the transverse rod 150. When picking up spikes, there would normally be rails on both sides of the track such that the front and back crawlers 156F and 156B may be locked into their upper or inoperative positions. The trays 244N and 244T are slid into the proper position shown in FIG. 5 and will now function in the same fashion as the stripper tray 144 used in the single magnetic wheel operation. The dual magnetic wheel support arm 226 may be pinned at either the right or left side pivot point 128R or 128L in similar fashion to the single magnetic wheel support arm or beam 126. Likewise, the trays 244T and 244N may be slid along the transverse rod 150 for either right or left side operation. The hydraulic lifter 190 will lift support arm 226 in the same fashion as it lifts support arm 126.

If it is desired to lift the machine 110 as a unit including either of the support arms 126 or 226 and the associated magnetic wheel or wheels, a bolt 192B and associated nut 192N (shown in FIG. 4 only) may secure the vertically extending portion 113 to the angle irons 140LF and 140LB attached to the frame structure 112. By bolting the support arm to these angle irons, a crane or similar device can be used to lift the total machine 110 by the lift hole 116. Angle irons 140RF and 140RB allow the machine to be lifted when the magnetic wheel or wheels are disposed on the right side of the machine.

The importance of pivoting the support arm 126 (or 226) about a pivot point (128R or 128L) on the opposite side from the magnetic wheel can best be understood by considering what would happen if arm 126 (or 226) was pinned to a central location on machine 110. If centrally pinned, a rise or fall of the magnetic wheel 122 (or 222N and 222T) would cause the magnetic wheel(s) to deviate substantially from its usual vertical plane causing uneven wear along its edge. By having support arm 126 (or 226) pinned at its far end, up and down movements of the magnetic wheel(s) will cause only minimal deviations from the vertical plane.

Unlike the prior art FIG. 1 device, the present machine 110 will have its magnetic wheel support arm 126 (or 226) pinned at only a single location (either 128R or 128L) during operation of the magnetic wheels(s). This allows support arm 126 (or 226) to pivot in a plane transverse to the right and left sides of machine 110.

As used herein, a stripper tray means would include one or a plurality of stripper trays as disclosed, whereas a stripper means shall include any mechanism which causes separation of metallic articles from one of the magnetic wheels. For example, if the magnetic wheels were realized by electromagnets instead of permanent magnets, a stripper means could simply be a circuit which turns off the electromagnets to allow them to fall to a storage means such as the horizontal conveyor belt 152.

Although the two magnetic wheel arrangement shown in FIG. 5 uses the same frame structure 112 as that shown in FIGS. 2–4, it will be readily understood that a simplified embodiment of the present invention would not include the crawlers 156F and 156B and the associated parts used for mounting the crawlers to the frame structure 112. In that case, the machine could be used for picking up spikes in the manner shown in FIG. 5, but would generally require two rails for rolling transportation since the absence of the crawlers would leave the machine without any supporting means for one side if operated on a single rail.

Although various materials and specific constructions have been shown herein, it is to be understood that these are for illustrative purposes only. Numerous modifications and adaptations will be readily apparent to those of ordinary skill in the art. Accordingly, the scope of the present invention should be determined by reference to the appended claims.

What is claimed is:

1. A railroad scrap pick up machine for picking up loose metallic parts along a railroad bed comprising:
   (a) a frame structure defining a front, a back, and first and second sides of the machine,
   (b) at least two wheels on said first side of said frame structure for rolling movement along at least a first rail on a railroad bed,
   (c) a first magnetic wheel rotatably disposed at said second side and mounted to a support beam extending across to said first side, said support beam being secured at a first side pivot point for pivoting in a plane transverse to said first and second sides,
   (d) supporting means for keeping said second side of said frame structure above the railroad bed as said at least two wheels roll along the at least one rail and as said first magnetic wheel rolls along in contact with a railroad bed,
   (e) a stripper means mounted to said structure,
   (f) a storage means mounted to said frame structure adjacent said stripper means and wherein said first magnetic wheel is operative to rotate and pick up metallic parts as said machine is moved along a railroad bed, said stripper means is operative to remove metallic parts from said first magnetic wheel and deposit the metallic parts on said storage means, and said first magnetic wheel follows peaks and troughs in a railroad bed by moving up and down with said support beam pivoting about said first side pivot point and without causing up and down movements of said frame structure.

2. The railroad scrap pick up machine of claim 1 wherein said stripper means is a stripper tray means in contact with said first magnetic wheel.

3. The railroad scrap pick up machine of claim 2 wherein said stripper tray means is slidable between said first side and said second side.

4. The railroad scrap pick up machine of claim 1 wherein said first magnetic wheel and its support beam are further securable at a second side pivot point with said first magnetic wheel rotatably disposed at said first side and said support beam extending to said second side.

5. The railroad scrap pick up machine of claim 1 further comprising:
   two wheels on said second side of said frame structure for rolling movement along a second rail on a railroad bed, and a lifter mounted to said frame structure for lifting said first magnetic wheel into an upper position removed from a railroad bed.

6. The railroad scrap pick up machine of claim 5 wherein said first magnetic wheel and its support beam are further securable at a second side pivot point with said first magnetic wheel rotatably disposed at said first side and said support beam extending to said second side, and said lifter is operative to lift said first magnetic wheel by lifting said support beam when said first magnetic wheel is disposed on said first side and when said first magnetic wheel is disposed on said second side.

7. The railroad scrap pick up machine of claim 1 wherein said storage means includes a lower support surface and said first magnetic wheel extends above a highest point of said lower support surface and said stripper means is operative to remove metallic parts from said first magnetic wheel whereupon the metallic parts move down to said storage means.

8. The railroad scrap pick up machine of claim 1 wherein said storage means is a horizontal conveyor belt.

9. The railroad scrap pick up machine of claim 1 wherein said supporting means includes a first crawler means mounted to said frame structure and disposable at said second side of said frame structure for supporting said machine in the absence of a rail on said second side.

10. The railroad scrap pick up machine of claim 9 further comprising:
    two wheels on said second side of said frame structure for rolling movement along a second rail on a railroad bed,
    and wherein said first crawler means is alternately disposable at said first side of said frame structure for supporting said machine in the absence of a rail on said first side and at said second side of said frame structure for supporting said machine in the absence of a rail on said second side.

11. The railroad scrap pick up machine of claim 10 wherein said first magnetic wheel and its support beam are further securable at a second side pivot point with said first magnetic wheel rotatably disposed at said first side and said support beam extending to said second side.

12. The railroad scrap pick up machine of claim 10 wherein said supporting means includes a second crawler means mounted to said frame structure and alternately disposable at said first side of said frame structure for supporting said machine in the absence of a rail on said first side and at said second side of said frame structure for supporting said machine in the absence of a rail on said second side, and said first and second crawler means are each mounted for sliding movement between said first side and said second side.

13. The railroad scrap pick up machine of claim 12 wherein said stripper means is a stripper tray means in contact with said first magnetic wheel and wherein said storage means includes a lower support surface and said first magnetic wheel extends above a highest point of said lower support surface and said stripper means is operative to remove metallic parts from said first magnetic wheel whereupon the metallic parts move down to said storage means.

14. The railroad scrap pick up machine of claim 12 further comprising:
    a second magnetic wheel rotatably disposed at said second side and wherein said second magnetic wheel is operative to rotate and pick up metallic parts as said machine is moved along a railroad bed, said stripper means is operative to remove metallic parts from said second magnetic wheel and deposit the metallic parts on said storage means, and said second magnetic wheel is free to follow peaks and troughs in a railroad bed without causing up and down movement of said frame structure.

15. The railroad scrap pick up machine of claim 14 wherein said second magnetic wheel is mounted to said support beam.

16. The railroad scrap pick up machine of claim 15 wherein said first and second magnetic wheels are removable and said machine is adapted to allow the mounting of a single magnetic wheel on said frame structure upon the removal of said first and second magnetic wheels, and said single magnetic wheel is operative to rotate and pick up metallic parts as said machine is moved along a railroad bed with said single magnetic wheel disposed in coplanar fashion to two of said wheels.

17. A railroad scrap pick up machine for picking up loose metallic parts along a railroad bed comprising:
(a) a frame structure defining a front, a back, and first and second sides of the machine,
(b) a plurality of wheels supporting said frame structure for rolling movement along two rails, at least one wheel mounted to each side of said frame structure,
(c) first and second magnetic wheels rotatably disposed at said second side,
(d) a stripper tray means mounted to said frame structure for contact with said first and second magnetic wheels,
(e) a storage means adjacent to said stripper means, and wherein said first and second magnetic wheels are operative to rotate and pick up metallic parts as said machine is moved along a railroad bed, said stripper tray means is operative to remove metallic parts from said first and second magnetic wheels and deposit the metallic parts on said storage means, and said first and second magnetic wheels are operative to follow peaks and troughs in a railroad bed by moving up and down without causing up and down movements of said frame structure, and wherein said storage means includes a lower support surface and said first and second magnetic wheels extend above a highest point of said lower support surface and said stripper tray means is operative to remove metallic parts from said first and second magnetic wheels whereupon the metallic parts move down to said storage means, wherein said first and second magnetic wheels have the same outer diameter, and said second magnetic wheel is mounted to said first magnetic wheel by a cylindrical portion having an outer diameter less than the outer diameter of said first and second magnetic wheels and further comprising a drive motor disposed at least partially within said cylindrical portion.

18. A railroad scrap pick up machine for picking up loose metallic parts along a railroad bed comprising:
(a) a frame structure defining a front, a back, and first and second sides of the machine,
(b) a plurality of wheels supporting said frame structure for rolling movement along two rails, at least one wheel mounted to each side of said frame structure,
(c) first and second magnetic wheels rotatably disposed at said second side,
(d) a stripper tray means mounted to said frame structure for contact with said first and second magnetic wheels,
(e) a storage means adjacent to said stripper means, and wherein said first and second magnetic wheels are operative to rotate and pick up metallic parts as said machine is moved along a railroad bed, said stripper tray means is operative to remove metallic parts from said first and second magnetic wheels and deposit the metallic parts on said storage means, and said first and second magnetic wheels are operative to follow peaks and troughs in a railroad bed by moving up and down without causing up and down movements of said frame structure, and wherein said storage means includes a lower support surface and said first and second magnetic wheels extend above a highest point of said lower support surface and said stripper tray means is operative to remove metallic parts from said first and second magnetic wheels whereupon the metallic parts move down to said storage means, and wherein said first and second magnetic wheels are mounted to a common support beam which extends across to said first side, said support beam being secured at a first side pivot for pivoting in a plane transverse to said first and second sides.

19. The railroad scrap pick up machine of claim 18 wherein said first and second magnetic wheels are disposable at said first side with said support beam secured at a second side pivot point for pivoting in a plane transverse to said first and second sides.

20. The railroad scrap pick up machine of claim 18 wherein said first and second magnetic wheels are disposable at said first side.

21. The railroad scrap pick up machine of claim 18 further comprising first and second crawler means separately mounted to said frame structure for sliding movement between said first side and said second side.

22. The railroad scrap pick up machine of claim 21 wherein said first and second magnetic wheels are removable and said machine is adapted to allow the mounting of a single magnetic wheel on said frame structure upon the removal of said first and second magnetic wheels, and said single magnetic wheel is operative to rotate and pick up metallic parts as said machine is moved along a railroad bed with said single magnetic wheel disposed in coplanar fashion to two of said wheels.

* * * * *